US 6,545,709 B2

(12) United States Patent
Takei et al.

(10) Patent No.: US 6,545,709 B2
(45) Date of Patent: Apr. 8, 2003

(54) WIRELESS RECEIVING APPARATUS AND METHOD THEREFOR

(75) Inventors: Hirofumi Takei, Yokohama (JP); Masamine Maeda, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/921,570

(22) Filed: Sep. 2, 1997

(65) Prior Publication Data

US 2002/0057350 A1 May 16, 2002

(30) Foreign Application Priority Data

Sep. 2, 1996 (JP) .............................................. 8-231687
May 30, 1997 (JP) .............................................. 9-141659

(51) Int. Cl.[7] .............................................. H04N 5/228
(52) U.S. Cl. ................. 348/222.1; 348/231.9; 382/236; 386/111; 714/708
(58) Field of Search ................. 348/143, 207, 348/207.99, 211.99, 211.1, 211.2, 222.1, 231.99, 231.7, 231.9, 723, 724, 725, 728; 714/708, 701; 382/232, 236; 386/95, 108–111, 113, 117; H04N 5/228

(56) References Cited

U.S. PATENT DOCUMENTS

| 5,127,021 A | * | 6/1992 | Schreiber ...................... 348/487 |
| 5,406,625 A | * | 4/1995 | Kotaka et al. ............... 380/201 |
| 5,450,086 A | * | 9/1995 | Kaiser .......................... 342/42 |
| 5,886,999 A | * | 3/1999 | Kojima et al. ................ 371/5.5 |
| 6,337,928 B1 | * | 1/2002 | Takahashi .................... 382/236 |

FOREIGN PATENT DOCUMENTS

JP            58-010974    *    1/1983    ............ H04N/5/26

* cited by examiner

Primary Examiner—Ngoc-Yen Vu
(74) Attorney, Agent, or Firm—Fitzpatrick, Cella, Harper & Scinto

(57) ABSTRACT

A wireless reception apparatus detects the reception status of a wireless transmitted information signal and counts the time of continuation of a predetermined inferior reception status according to the result of detection. The wireless reception apparatus further terminates the recording operation of a recording unit in case the counted time of continuation reaches a predetermined value. Such control of the recording operation according to the reception status of the received signal allows to suppress the wasted use of the recording medium and to lower the wasted electric power consumption.

12 Claims, 13 Drawing Sheets

WIRELESS RECEIVING APPARATUS AND METHOD THEREFOR

BACKGROUND OF THE INVENTION

1. Field of the Invention

The present invention relates to a wireless receiving apparatus and a method therefor, and more particularly to a technology for recording wireless transmitted image information on a recording medium.

2. Related Background Art

There is recently proposed a configuration of the video camera which is divided into a camera unit for generating image information from the optical image of the object and a recording unit for recording the image information generated by the camera unit and in which the image information of the camera unit is wireless transmitted to the recording unit.

FIG. 1 is a block diagram showing the configuration of an image pickup device 100 having the above-mentioned camera unit, and FIG. 2 is a block diagram showing the configuration of a recording device 200 having the above-mentioned recording unit.

Referring to FIG. 1, there are provided a camera unit 102 for converting the optical image of the object into an electrical signal thereby generating image signal; a control unit 104 for controlling the entire image pickup device 100, including for example focus control and exposure control; a wireless transmission circuit 106 for wireless transmission of the image signal generated in the camera unit 102 and the control signal generated in the control unit 104 to an external recording device; a wireless reception circuit 108 for demodulating the wireless signal transmitted from an external device thereby restoring the signal before transmission; an antenna 110; a switch 112 for either (a) sending the output of the wireless transmission circuit 106 to the antenna 110, or (b) sending the output of the antenna 110 to the wireless reception circuit 108 under the control of the control unit 104; and a power supply unit 114 for electric power supply to the entire image pickup device 100.

Referring to FIG. 2, there are provided an antenna 202; a switch 204 for either (a) sending the output of a wireless transmission circuit 208 to the antenna 202, or (b) sending the output of the antenna 202 to the wireless reception circuit 205; a wireless reception circuit 206 for demodulating the wireless signal transmitted from the external image pickup device thereby restoring the signal before transmission; a wireless transmission circuit 208 for effecting a modulation process for wireless transmission of the control signal, released from a control unit 212, to an external device; a recording unit 210 for recording the image information transmitted from the external device on a recording medium such as a magnetic tape and reproducing such recorded information; a control unit 212 for controlling the entire recording device 200, capable of controlling the recording and reproducing operations of the recording unit by unrepresented operation keys; and a power supply unit 214 for electric power supply to the entire recording device 200.

The above-explained configuration allows the recording device 200 to record the image information, sent by wireless transmission from the image pickup device 100, on the magnetic tape or the like by controlling the recording unit 210.

Also in recent years, the transmission of the image information by the spread spectrum communication methods is attracting attention for the wireless communication in such wireless system as mentioned above.

In the following there will be given a brief explanation of the direct sequence modulation, which is one of the modulation methods employed in the spread spectrum communication.

In the direct sequence modulation, the transmitting device effects diffusion modulation of the information signal to be transmitted (base band signal) by means of a series of diffusion codes such as pseudo noise (PN) codes, so as to obtain a signal of a band width which is extremely wider than that of the base band signal. The diffusion modulated signal, after the direct sequence modulation, is further modulated, for example by PSK (phase shift keying) or FSK (frequency shift keying), into a signal of a wireless frequency and is wireless transmitted.

The receiving device converts the received signal of the wireless frequency by a demodulation process, corresponding to the modulation process in the transmitting device, into the diffusion modulated signal. The receiving device further executes an inverse diffusion modulation on such diffusion modulated signal, utilizing a series of diffusion codes, same as that employed in the diffusion modulation of the transmitting device, thereby restoring the base band signal prior to the transmission.

In such spread spectrum communication utilizing the direct sequence modulation, the information signal is transmitted with a transmission band much wider than that of the original information signal. For this reason, if the transmission band width is given, the transfer rate is significantly lower than that in the ordinary wireless transmission without the diffused modulation. Consequently, the above-explained direct sequence modulation is not suitable for the high-speed transmission of a large amount of data such as image information.

The wireless communication system explained above has been associated with the following drawbacks. Because the image pickup device 100 and the recording device 200 are mutually separated, each device has to be equipped with a battery. Consequently, in the course of wireless communication of the image information between the image pickup device 100 and the recording device 200, in a case where the image pickup device 100 develops an abnormality (for example the transmission of the image information is disabled for example by a low battery capacity of the power supply unit 114 or by cutting off of the power supply in the image pickup device 100), the wireless reception circuit 206 and the recording unit 210 in the recording device 200 continue the process, thereby continuing the recording of the abnormal reception signal and wasting the electric power of the recording device 200.

A similar situation arises also in a case where the image information cannot be properly received for a prolonged period by a large distance between the image pickup device 100 and the recording device 200 or by the presence of an obstacle therebetween.

SUMMARY OF THE INVENTION

An object of the present invention is to solve the above-described drawbacks.

Another object of the present invention is to provide a wireless receiving device capable of controlling the recording operation in the wireless reception device according the status of reception of the signal, thereby suppressing the wasted use of the recording medium and the wasted electric power consumption.

The above-mentioned objects can be attained, according a preferred embodiment of the present invention, by a wireless receiving apparatus for receiving a wireless transmitted information signal and recording the information signal on a recording medium through a recording unit, comprising:

a) detection means for detecting the reception status of the information signal;

b) timer means for counting time of continuation of a predetermined inferior reception status, according to the result of detection by the detection means; and c) control means for terminating the recording operation of the recording unit in a case where the time of continuation counted by the timer means becomes at least equal to a predetermined time.

According to another embodiment, there is also provided a wireless receiving apparatus for receiving a wireless transmitted information signal and recording the information signal on a recording medium through a recording unit, comprising:

a) detection means for detecting the reception status of the information signal; and b) control means for controlling the recording operation of the recording unit according to the result of detection by the detection means and causing information signal, received prior to the first-mentioned information signal, to be recorded on the recording medium;

wherein the control means is adapted to terminate the recording operation of the recording unit in a case where the information signal, received prior to the first-mentioned information signal, is recorded at least for a predetermined time.

According to still another embodiment, there is also provided a wireless receiving apparatus comprising:

a) reception means for receiving a wireless transmitted image signal;

b) detection means for detecting the error status of the image signal received by the reception means;

c) recording means for recording the image signal received by the reception means; and d) control means for controlling the recording means, according to the error status of the image signal detected by the detection means, in such a manner as to record an image signal received prior to the first-mentioned image signal;

wherein the control means is adapted to terminate the recording operation of the recording means in a case where a predetermined error status of the image signal continues at least for a predetermined time.

According to still another embodiment, there is also provided a wireless receiving apparatus comprising:

a) reception means for receiving a wireless transmitted image signal;

b) detection means for detecting the error status of the image signal received by the reception means;

c) recording means for recording the image signal, received prior to the first-mentioned image signal, according to the error status of the image signal detected by the detection means;

d) display means for displaying the image signal received by the reception means; and e) control means for causing the display means to display a warning signal indicating the error status, in a case where a predetermined error status of the image signal continues for a predetermined time.

Still another object of the present invention is to provide a wireless receiving method capable of controlling the recording operation in the wireless reception device according the status of reception of the signal, thereby suppressing the wasted use of the recording medium and the wasted electric power consumption.

The above-mentioned object can be attained, according a preferred embodiment of the present invention, by a wireless receiving method for receiving a wireless transmitted information signal and recording the information signal on a recording medium through a recording unit, comprising:

a) a detection step of detecting the reception status of the information signal;

b) a counting step of counting time of continuation of a predetermined inferior reception status, according to the result of detection obtained in the detection step; and c) a control step of terminating the recording operation of the recording unit in a case where the time of continuation counted in the counting step becomes at least equal to a predetermined time.

According to another embodiment, there is also provided a wireless receiving method for receiving a wireless transmitted information signal and recording the information signal on a recording medium through a recording unit, comprising:

a) a detection step of detecting the reception status of the information signal; and b) a control step of controlling the recording operation of the recording unit according to the result of detection obtained in the detection step and causing an information signal, received prior to the first-mentioned information signal, to be recorded on the recording medium;

wherein the control step is adapted to terminate the recording operation of the recording unit in a case where the information signal, received prior to the first-mentioned information signal, is recorded at least for a predetermined time.

According to still another embodiment, there is also provided a wireless receiving method comprising:

a) a reception step of receiving a wireless transmitted image signal;

b) a detection step of detecting the error status of the image signal obtained in the reception step;

c) a recording step of recording the image signal obtained in the reception step; and d) a control step of controlling the recording step, according to the error status of the image signal detected in the detection step, in such a manner as to record an image signal received prior to the first-mentioned image signal;

wherein the control step is adapted to terminate the recording operation of the recording step in a case where a predetermined error status of the image signal continues at least for a predetermined time.

According to still another embodiment, there is also provided a wireless receiving method comprising:

a) a reception step of receiving a wireless transmitted image signal;

b) a detection step of detecting the error status of the image signal obtained in the reception step;

c) a recording step of recording the image signal, received prior to the first-mentioned image signal, according to the error status of the image signal detected in the detection step;

d) a display step of displaying the image signal obtained in the reception step; and e) a control step of displaying a warning signal indicating the error status, in a case where a predetermined error status of the image signal continues for a predetermined time.

Still other objects of the present invention, and the advantages thereof, will become fully apparent from the following detailed description of the embodiments.

DETAILED DESCRIPTION OF THE PREFERRED EMBODIMENTS

The preferred embodiments of the present invention will be described in detail hereinafter with reference to the accompanying drawing.

[First embodiment]

In the following there will be explained the wireless receiving device and method therefor, constituting a first embodiment of the present invention.

Figure 1:
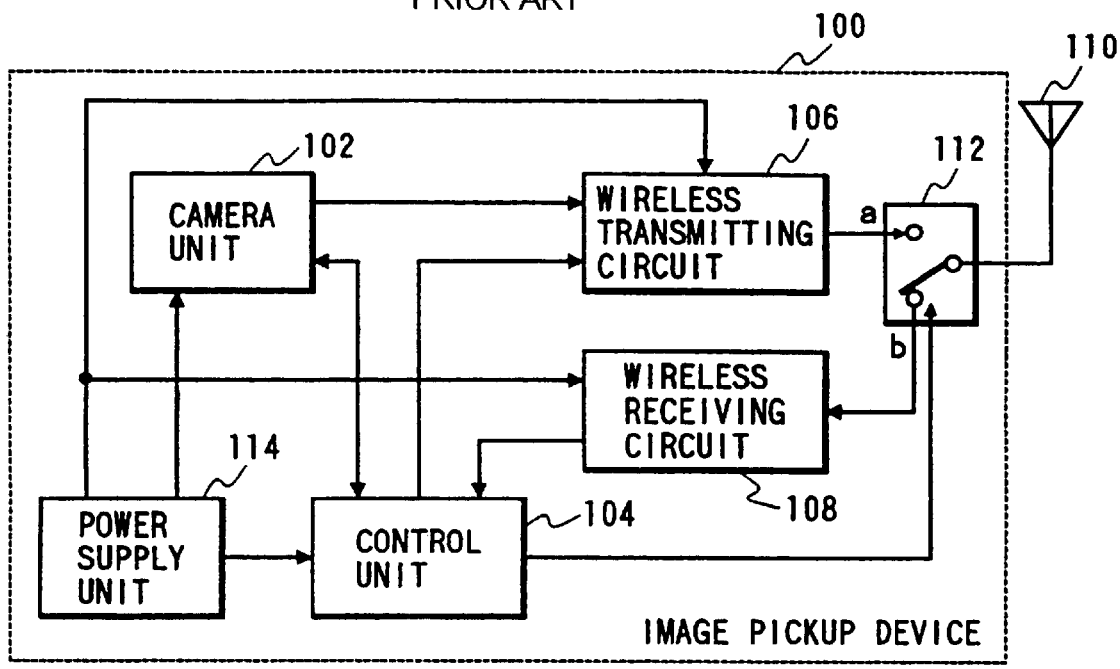
FIG. 1 is a block diagram showing the configuration of an image pickup device 100 having a conventional camera unit.
Figure 2:
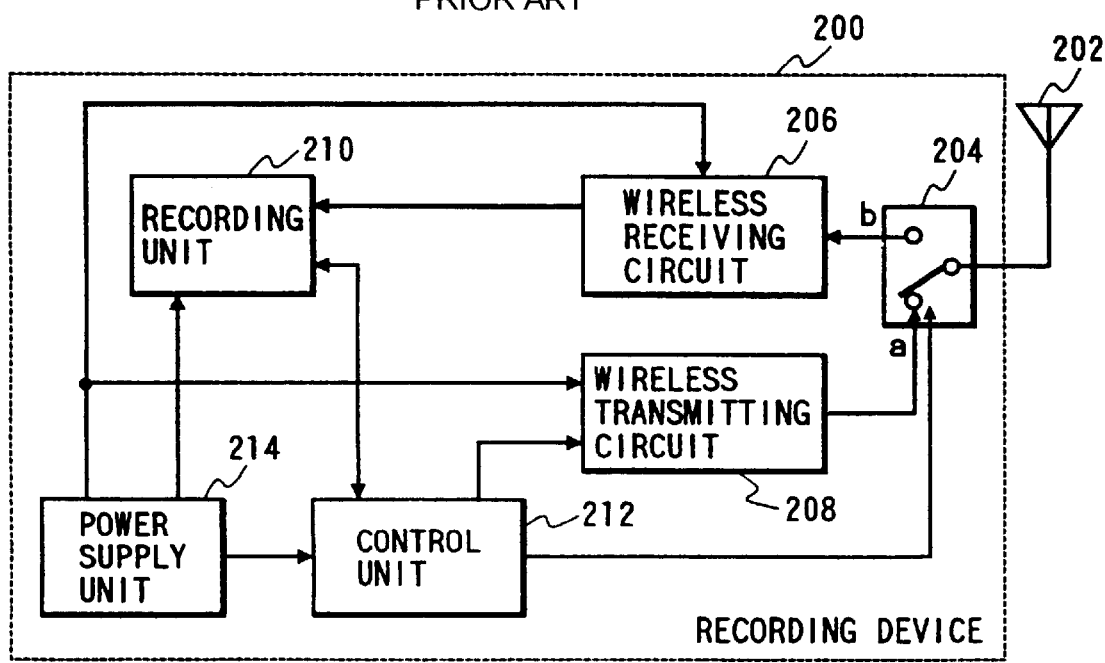
FIG. 2 is a block diagram showing the configuration of a recording device 200 having a conventional recording unit.
Figure 3:
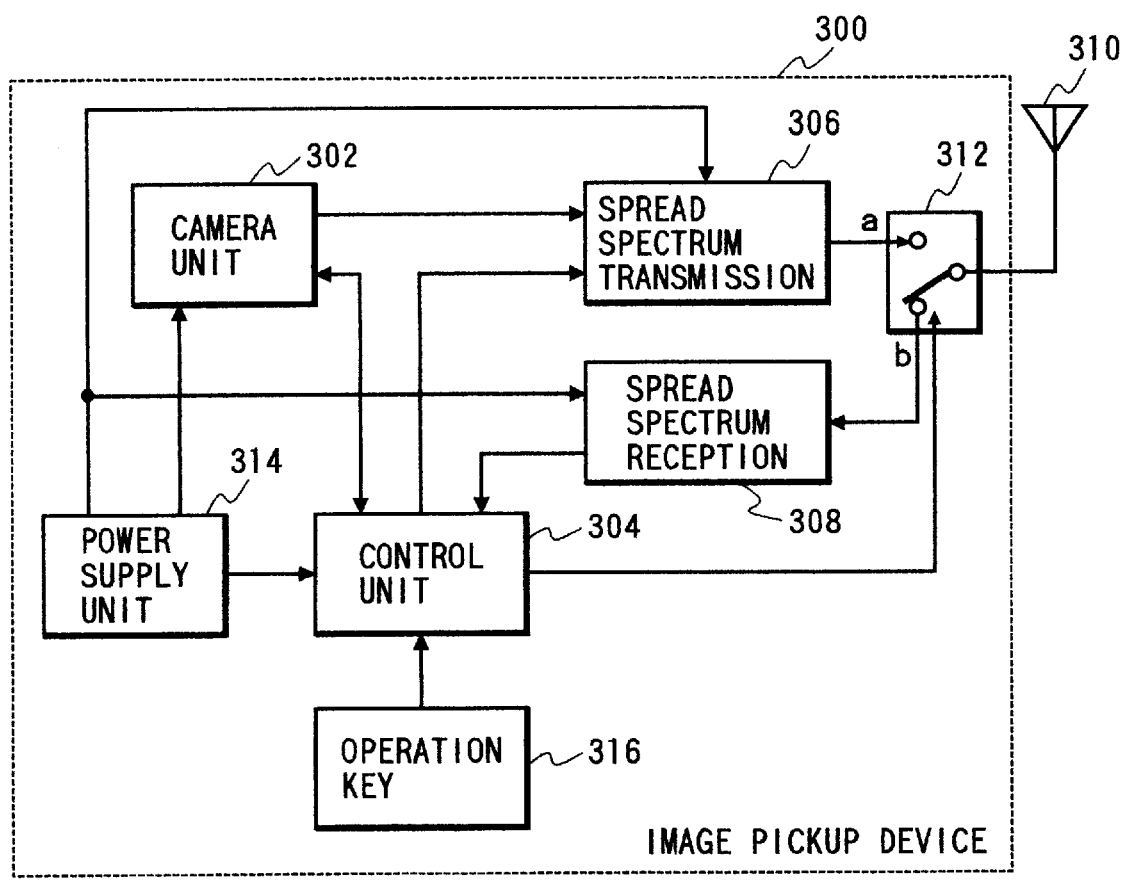
FIG. 3 is a block diagram showing the configuration of an image pickup device 300 constituting a first embodiment of the present invention.

FIG. 3 is a block diagram showing the configuration of an image pickup device 300, constituting a first embodiment of the present invention.

Referring to FIG. 3, a camera unit 302 is provided with an image pickup unit (to be explained with reference to FIG. 4) for converting the optical image of the object into an electrical signal thereby generating an image signal, and a voice signal generation circuit (to be explained with reference to FIG. 4) for collecting external voice to generate a voice signal. A control unit 304, containing a microcomputer and adapted to control the entire image pickup device 300, controls the camera unit 302 according for example to a focus control signal and an exposure control signal entered from operation keys 316.

A spread spectrum transmission circuit 306 executes diffusion modulation of the information signal to be transmitted (base band signal) utilizing a series of diffusion codes such as pseudo noise (PN) codes and further modulates thus diffusion modulated signal into a wireless frequency signal for example by PSK (phase shift keying) or FSK (frequency shift keying). The spread spectrum transmission circuit 306 executes modulation on the image signal and the voice signal generated in the camera unit 302 and the control signal etc. released from the control unit 304. A spread spectrum reception circuit 308 converts the received wireless frequency signal into the diffusion modulated signal by a demodulation process corresponding to the modulation process in the external device, and further executes an inverse diffusion modulation on such diffusion modulated signal, utilizing diffusion codes same as those in the diffusion modulation of the external device. The spread spectrum reception circuit 308 demodulates the control signal (for example for controlling various process circuits of the camera unit 302), which is wireless transmitted from the external device, thereby restoring the signal prior to the transmission.

There are also provided an antenna 310; a switch 312 for sending either (a) the output of the spread spectrum transmission circuit 306 to the antenna 310 or (b) the output of the antenna 310 to the spread spectrum reception circuit 308; a power supply unit 314 for electric power supply to the entire image pickup device 300; and operation keys 316 for instructing the operations of the process circuits provided in the camera unit 302.

Figure 4:
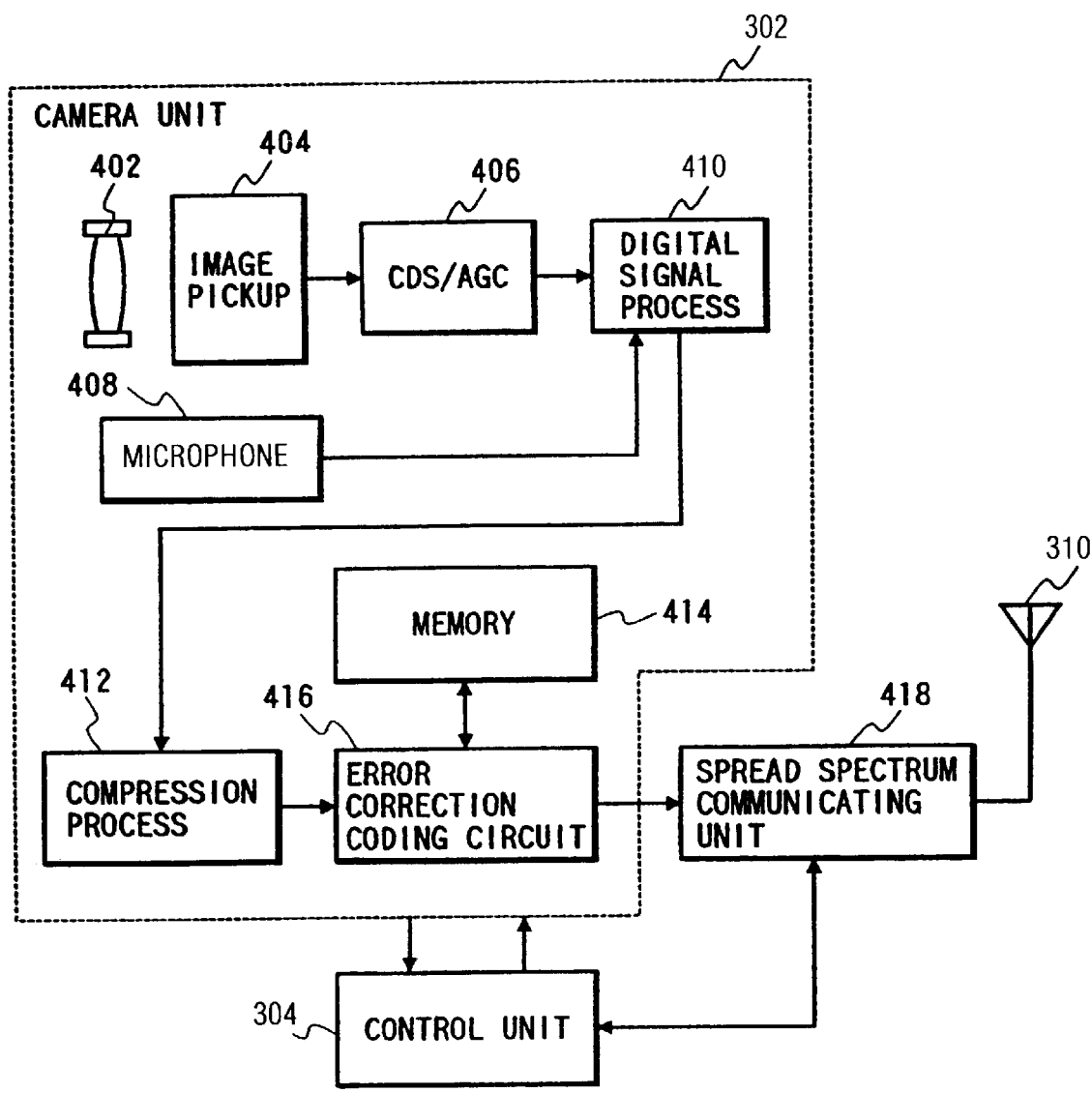
FIG. 4 is a block diagram showing the details of a camera unit 302.

FIG. 4 is a block diagram showing the details of the camera unit 302 shown in FIG. 3, wherein components equivalent to those in FIG. 3 are represented by same numbers and will not be explained further.

Referring to FIG. 4, there are provided an image taking lens 402 for focusing the optical image of the object onto an image taking face (photoelectric converting plane) of an image pickup device 404; a CDS/AGC circuit 406 for effecting sample holding and gain control on the image signal released from the image pickup device 404; a digital signal processing circuit 410 for converting the analog output of the CDS/AGC circuit 404 into a digital signal and applying thereon predetermined camera signal processing (for example gamma conversion and luminance/color difference signal separation) to generate image signals; and a compression process circuit 412 capable of compressing the output image data from the digital signal processing circuit 410, by an efficient compression encoding method such as JPEG for example for each image frame, and also containing a voice signal generation circuit for generating a predetermined voice signal from the external voice collected by a microphone 408.

A control unit 304, provided with a microcomputer for controlling various process circuits of the camera unit 302, effects error correction encoding on the compressed image data and the voice signal of an image frame from the compression circuit 412, utilizing a buffer memory 414 and an error correction encoding circuit 416 for each predetermined unit of data, and sends the error correction encoded data to a spread spectrum transmission circuit 418, which modulates the error correction encoded data into a radio frequency signal of spread spectrum system, for supply to the antenna 310.

The spread spectrum communication unit 418 is composed of the spread spectrum transmission circuit 306, the spread spectrum reception circuit 308 and the switch 312.

Figure 5:
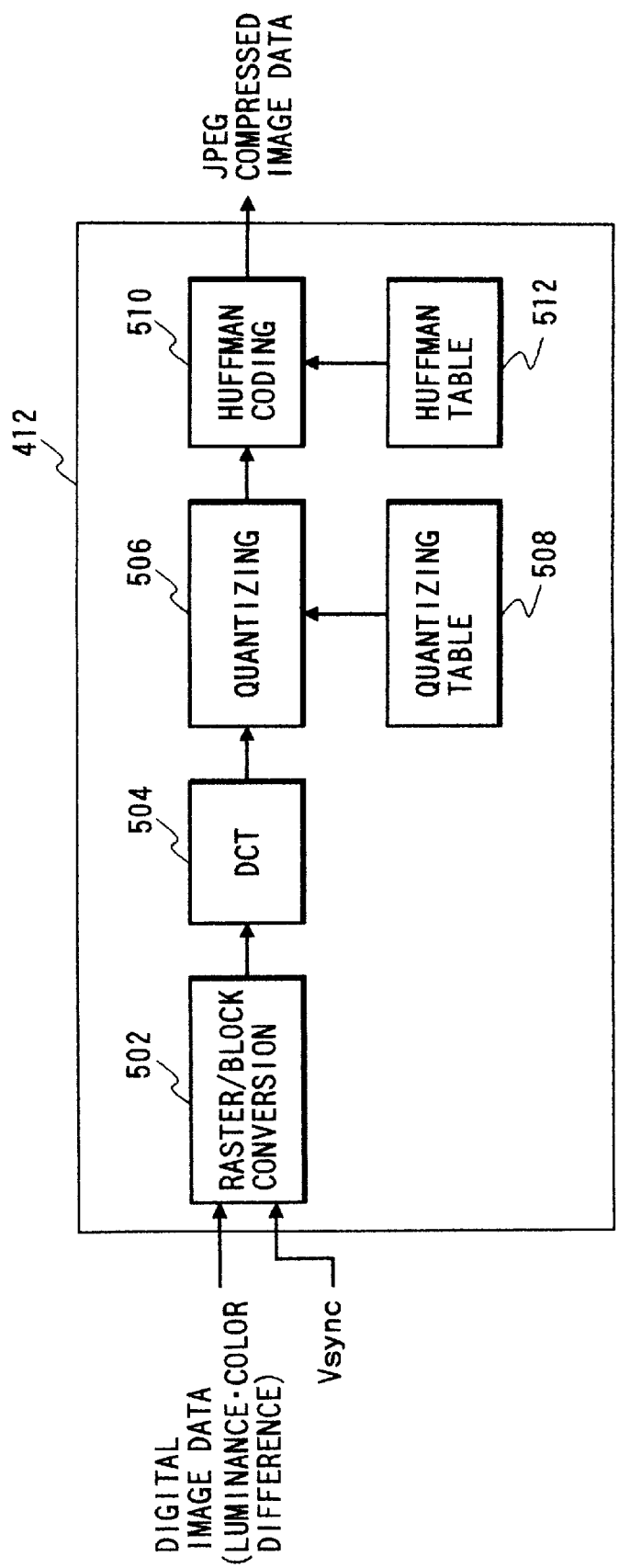
FIG. 5 is a block diagram showing the details of a compression circuit 412.

FIG. 5 is a block diagram showing the details of the compression circuit 412 shown in FIG. 4.

In FIG. 5, there are provided a raster/block conversion circuit 502 having a memory for storing the image data sequentially entered in rasters and adapted to generate block data composed of a predetermined number of pixels; a DCT circuit 504 for executing discrete cosine transformation on the block image data released from the raster/block conversion circuit 502; a quantization circuit 506 for quantizing the output (transformation coefficient data) of the DCT circuit 504 according to a quantization table generated by a quantization table generation circuit 508; and a Huffman encoding circuit 510 for Huffman encoding the output (quantization coefficient data) of the quantization circuit 506 according to a Huffman table generated by a Huffman table generation circuit 512. The Huffman encoding circuit 510 generates JPEG compressed image data.

The circuit shown in FIG. 5 functions in the following manner. The raster/block conversion circuit 502 divides the digital image signal (luminance/color difference signals) of raster format into blocks of 8×8 pixels each, thereby generating square matrix data of 8×8 pixels. The DCT circuit 504 executes the discrete cosine transformation on the block data of 8×8 pixels from the raster/block conversion circuit 502. The result of transformation is called DCT coefficients, which are arranged in an 8×8 matrix as in the data prior to the transformation. The upper left coefficients in the DCT coefficient matrix represent the magnitude of the low-frequency components of the original image, and the lower right ones represent the magnitude of the high-frequency components of the original image.

The quantization circuit 506 at first divides the DCT coefficients with the quantization table. The quantization table is weighted larger in the high-frequency components than in the low-frequency components, so that the high-frequency components are suppressed in the results of division. The results of division are then quantized, and values not exceeding a certain predetermined value are discarded as 0. As a result, most of the lower right values in the matrix after quantization become zero.

The Huffman encoding circuit 510 executes zigzag scanning on the matrix data obtained by quantization in the quantization circuit 506, thereby generating a data train. The encoding circuit then executes Huffman encoding on thus obtained data train, by referring to a Huffman table. The Huffman encoding replaces a redundant portion of data (for example a data portion having a same value in consecutive manner) with another short code. Consequently a data portion having a value 0 in consecutive manner is significantly shortened, so that the amount of the image data is compressed.

Figure 6:
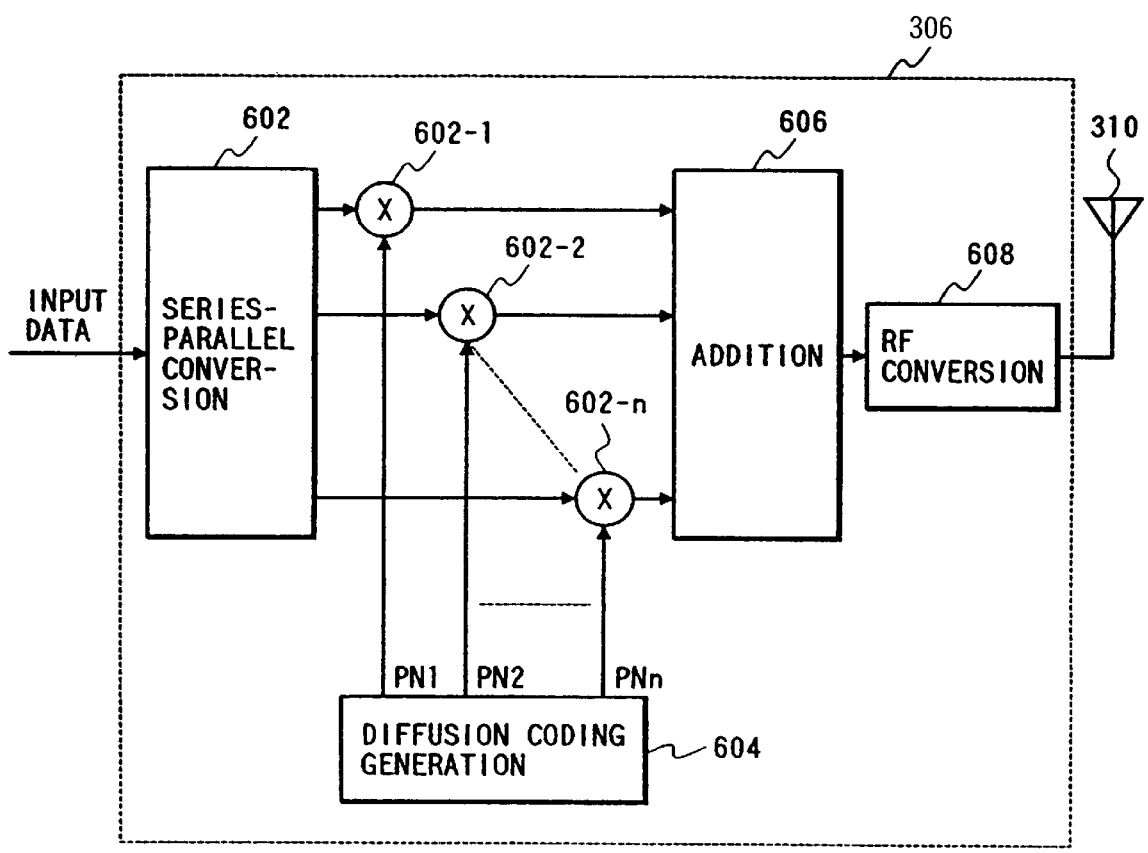
FIG. 6 is a block diagram showing the details of a spread spectrum transmission circuit 418 employed in the above-mentioned embodiment.

FIG. 6 is a block diagram showing the details of the spread spectrum transmission circuit 306 employed in the present embodiment.

Referring to FIG. 6, a serial/parallel conversion circuit 602 converts the compressed image data or the voice signal after error correction encoding into n parallel data. Multipliers 602-1, 602-2, . . . , 602-n respectively multiply the n parallel data, released from the serial-parallel conversion circuit 602 with diffusion codes PN1, PN2, . . . , PNn generated by a diffusion code generation circuit 604, whereby the compressed image data are converted into wide-band diffused signals of n channels. Then an adder 606 multiplexes the outputs of the multipliers 602-1 to 602-n by adding, for supply to an RF conversion circuit 608, which converts the output of the adder 606 into a transmission frequency signal of a suitable central frequency, for supply to the transmission antenna 310.

Figure 7:
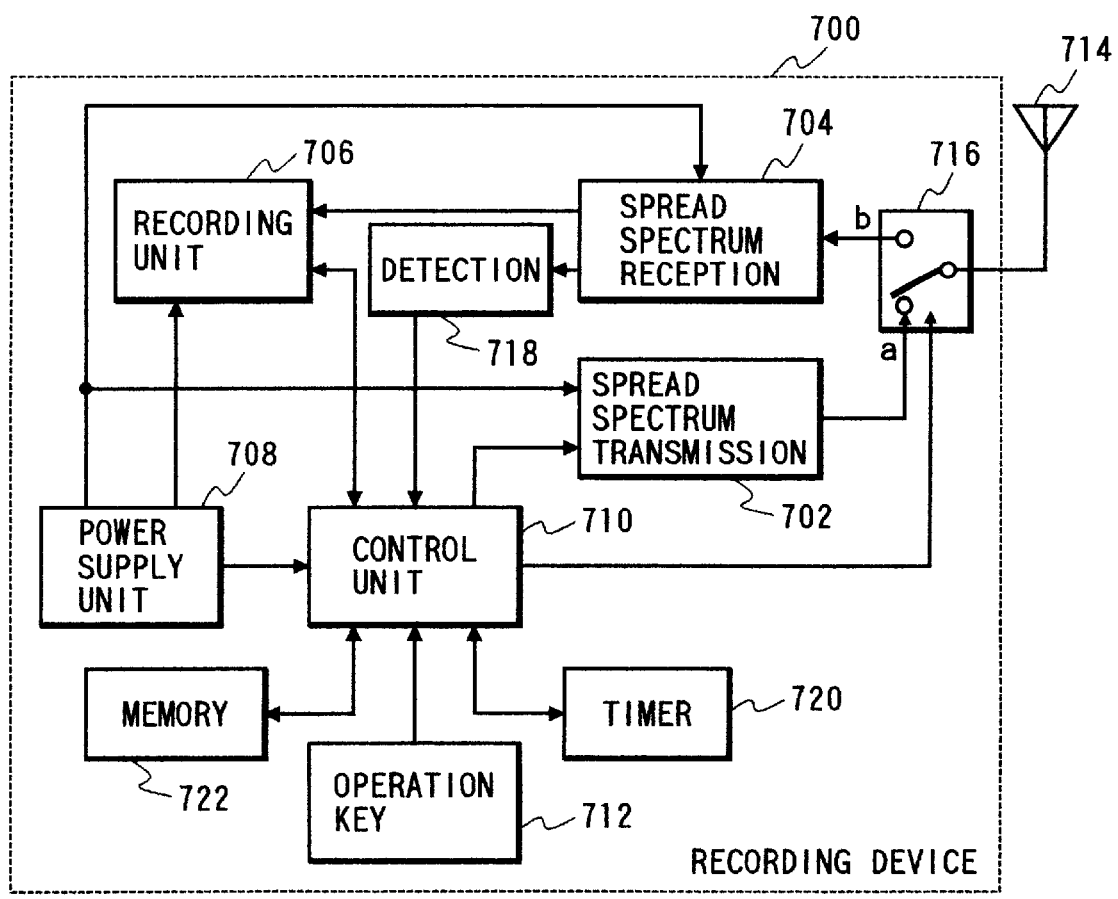
FIG. 7 is a block diagram showing the configuration of a recording device 700 constituting the first embodiment of the present invention.

FIG. 7 is a block diagram showing the configuration of a recording device 700 in the first embodiment of the present invention.

Referring to FIG. 7, a spread spectrum transmission circuit 702 effects diffusion modulation on the information signal to be transmitted (base band signal) utilizing a series of diffusion codes such as pseudo noise (PN) codes, and further modulates the diffusion modulated signal into a wireless frequency signal, for example by PSK (phase shift keying) or FSK (frequency shift keying). It modulates the control signal (for example for controlling various process circuits of the camera unit 302) released from a control unit 710.

A spread spectrum reception circuit 704 converts the received wireless frequency signal into the diffusion modulated signal by a demodulation process corresponding to the modulation process of the external device, and further effects inverse diffusion modulation on such diffusion modulated signal by diffusion codes same as those employed in the diffusion modulation of the external device. It demodulates the image signal and the voice signal which are wireless transmitted from the image pickup device 300, thereby restoring the signals prior to the transmission.

There are also provided a recording unit 706 for recording the image signal and the voice signal transmitted from the image pickup device 300 on a recording medium such as a magnetic tape, and reproducing such recorded signals; a power supply unit 708 for electric power supply for the entire recording device 700; and a control unit 710 composed for example of a microcomputer and adapted to control the entire recording device 700 according the instructions of operation keys 712, particularly the recording and reproducing operations of the recording device 700. The control unit 710 is also provided with a timer 720 for starting time measurement in response to the output from a reception status detection circuit 718, and a memory 722 for storing the information signal.

There are further provided operation keys 712 for instructing the recording/reproducing operations of the recording unit 706 and the operations of the camera unit 302; an antenna 714; a switch 716 for sending either (a) the output of the spread spectrum transmission circuit 702 to the antenna 714, or (b) the output of the antenna 714 to the spread spectrum reception circuit 704; and a detection circuit 718 for detecting whether the reception carrier signal, supplied from the spread spectrum reception circuit 704, exceeds a predetermined level and supplying the control unit 710 with a signal indicating the result of such detection, namely indicating the reception status of the received signal.

Figure 8:
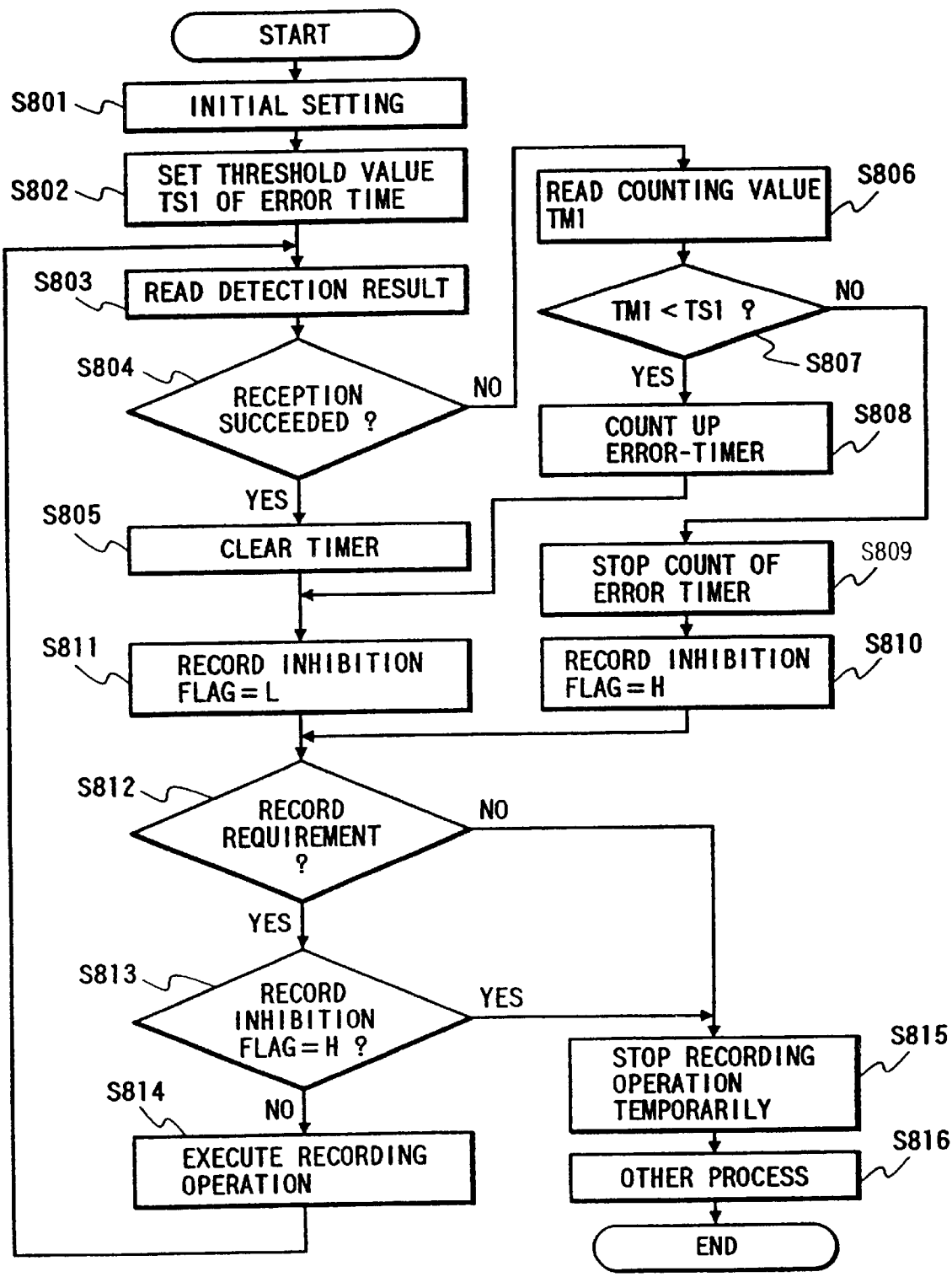
FIG. 8 is a flow chart showing the function of a control unit 710 for controlling the recording operation of a recording unit 706.

FIG. 8 is a flow chart showing the function of the control unit 710 in controlling the recording operation of the recording unit 706.

Referring to FIG. 8, at first the recording unit 706 shown in FIG. 7 is initialized (S801). Then there is set a threshold value TS1 indicating a continuous error time for inhibiting the start of the recording operation (S802), and the output of the detection circuit 718 is fetched (S803). The control unit 710 discriminates, based on the output of the detection circuit 718, whether the signal of a proper range is received (S804), and, if proper reception is made, clears the timer 720 for measuring the error time (S805) and shifts a recording inhibition flag to L (low-level) (S811). If the reception is not proper, the count TM1 of the timer is fetched in the memory (S806), and TM1 is compared with TS1 (S807). If TM1 is smaller, the timer is counted up (S808) and the recording inhibition flag is shifted to L (S811). If TM1 is equal to or larger than TS1, the counting operation of the timer is terminated (S809) and the recording inhibition flag is shifted to H (S810).

After the step S810 or S811, the control unit 710 discriminates whether a recording request (generated for example by the depression of a recording switch, by the user with an operation key 712) has been generated or still continues (S812). If the recording request has been entered and the recording inhibition flag is not H (S813), the control unit 710 causes the recording unit 706 to start or continue the recording operation (S814). After the step S814, the control unit 710 returns to the process of the step S803.

If the recording request has not been entered into the control unit 710 (S812), or if the recording inhibition flag is H even in the presence of the recording request (S813), the control unit 710 terminates the recording operation of the recording unit 706 (S815). After the step S815, the control unit 710 executes other processes in the recording unit 706 (S816), and then terminates the control of the recording operation.

In the above-explained control, in a case where the image pickup device 300 in a distant location is unable to transmit the image and voice signals of a sufficient reception level to the recording device 700, for example, because of exhaustion of the battery of the image pickup device 300, the detection circuit 718 detects a reception error (S804), but the counting operation of the timer 720 is continued (S808) until the threshold value TS1 is reached (S807), whereby the recording operation is continued (S814). If the reception error continues (S804) and the count TM1 of the timer 720 becomes equal to or larger than the error threshold value TS1, the recording inhibition flag is shifted to H (S809), whereby the recording operation is terminated (S815) regardless of the presence or absence of the recording request (S812).

If the image and voice signals become receivable with a proper reception level, for example by the recovery of the power supply of the image pickup device 300 (S804), the recording operation is executed in response to the recording request (S812–S814).

If the first embodiment, as explained in the foregoing, in a case where the proper transmission of the image information becomes impossible for a predetermined period, for example because of a lowered battery capacity of the power supply unit 314 in the image pickup device 300 or cutting off of the power supply thereto, the recording operation for such image information is temporarily suspended. Consequently, there can be prevented the wasted consumption of the recording medium resulting from the abnormal reception signal and the wasted electric power consumption.

The recording operation of the image signal is suspended also in a case where the image information from the image pickup device 300 cannot be received properly for a predetermined time, because of a large distance between the image pickup device 300 and the recording device 700 or the presence of an obstacle therebetween. Consequently, there can be prevented the wasted consumption of the recording medium resulting from the abnormal reception signal and the wasted electric power consumption.

[Second Embodiment]

In the following there will be explained a wireless reception device and a method therefor, constituting a second embodiment of the present invention. In the second embodiment, components or configurations similar to those in the first embodiment are represented by same numbers or symbols and will not be explained further. Also processes similar to those in the first embodiment will not be explained in repeated manner.

In the first embodiment, the detection circuit 718 judges the proper reception status, based on the signal level of the received carrier, and the control unit 710 controls the recording operation of the recording unit 706, based on the result of such judgment. In the configuration of the second embodiment, the detection circuit 718 is replaced by an error rate detection circuit 901 for detecting the error rate of the reception signal, and the recording operation of a recording unit 903 is controlled by the result of such detection.

Figure 9:
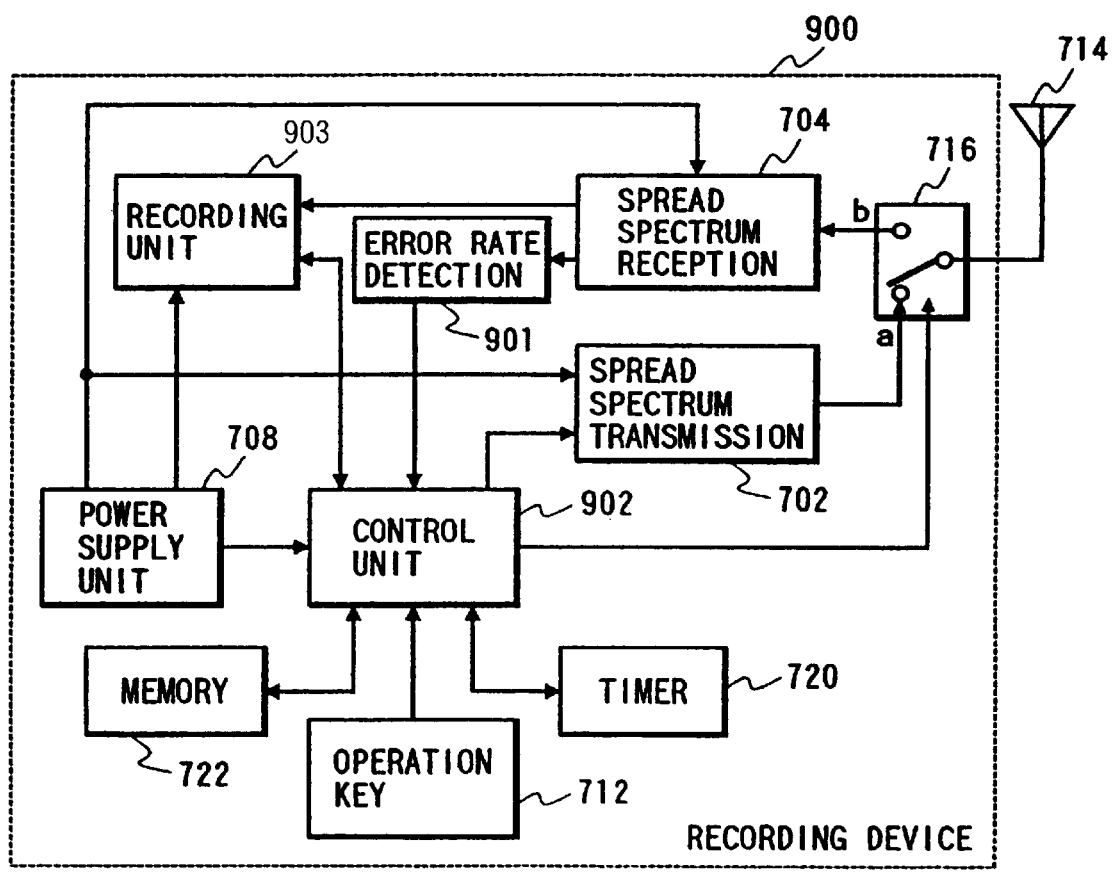
FIG. 9 is a block diagram showing the configuration of a recording device 900 constituting a second embodiment of the present invention.

FIG. 9 is a block diagram showing the configuration of a recording device 900 in the second embodiment of the present invention. The recording device 900 is capable of receiving the image and voice signals, sent by wireless transmission from the image pickup device 300 shown in FIG. 3.

Referring to FIG. 9, a spread spectrum reception circuit 704 demodulates the reception signal (including image and voice signals), obtained by wireless transmission from an external device (for example the image pickup device 300), and supplies an error rate detection circuit 901 with the obtained demodulated signal. The error rate detection signal 901 executes error correction on the reception signal supplied from the spread spectrum reception circuit 704, and detects the error rate from the proportion of the reception signal that cannot be corrected. The error rate information detected in the error rate detection circuit 901 is supplied to a control unit 902 and is used for controlling the recording operation of the recording unit 903.

Figure 10:
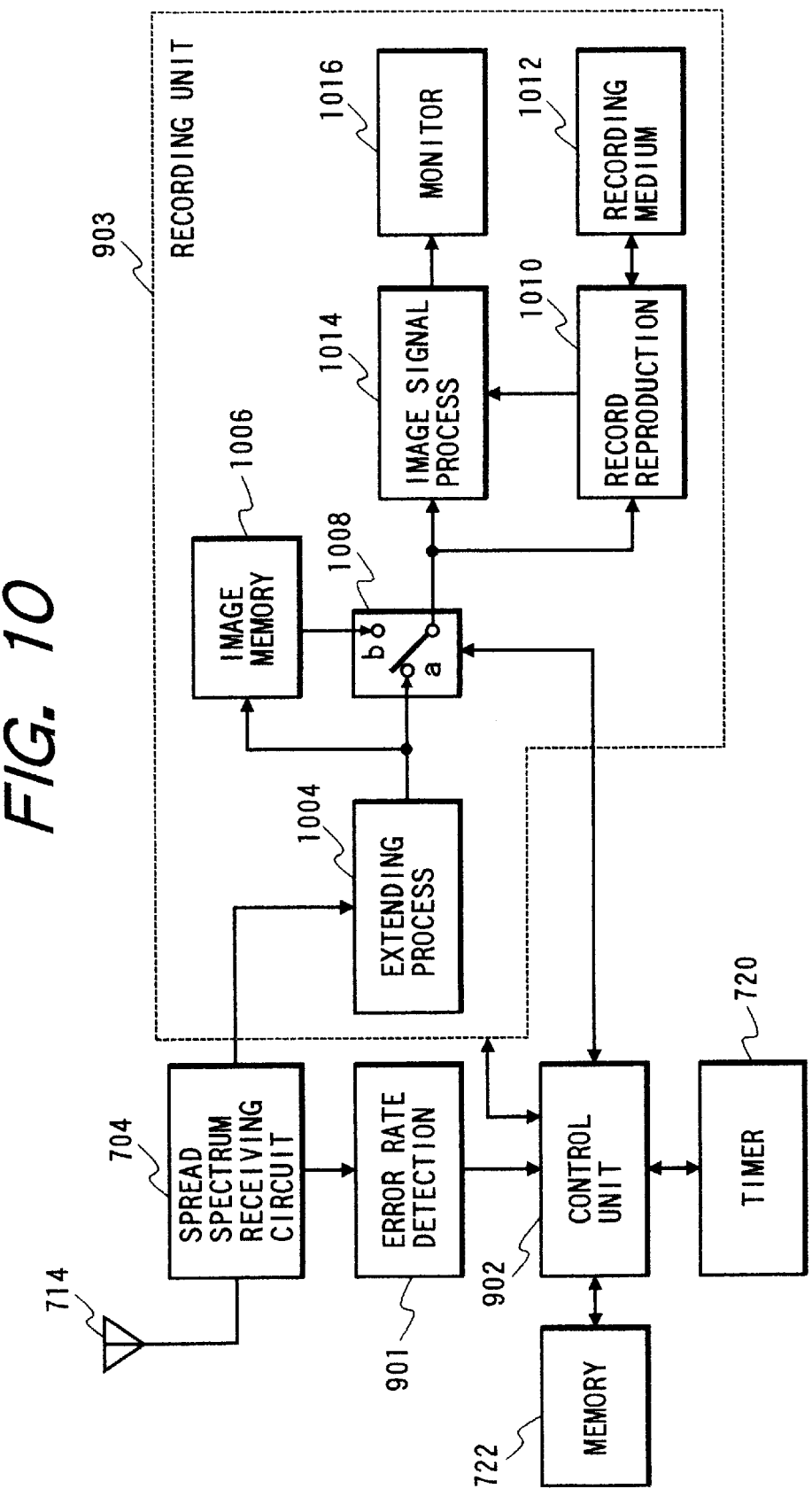
FIG. 10 is a block diagram showing the details of an example of the configuration of a recording unit 903.

FIG. 10 is a block diagram showing the details of an example of the recording unit 903 shown in FIG. 9, wherein components equivalent to those in FIGS. 7 and 9 are represented by corresponding numbers and will not be explained further.

Referring to FIG. 10, the RF signal received by the antenna 714 is supplied to the spread spectrum reception circuit 704 an is subjected therein to inverse spectrum spreading. The control unit 902 is provided with a microcomputer for controlling the various process circuits in the recording unit 903, and executes control in such a manner that the reception data, subjected to inverse sprectrum spreading, are subjected to error correction by an error correction circuit provided in the spread spectrum reception circuit and are then supplied, by a predetermined data unit, to an expansion process circuit 1004. The error correction circuit executes error correction for the predetermined data unit in the image data of an image frame, and the error rate detection circuit 901 releases a status signal by judging the error state of the image data of an image frame, based on the result of comparison of the result of error correction (for example the proportion of error data that cannot be corrected) with a predetermined threshold value.

There are also provided an expansion circuit 1004 for expanding the image data, compressed in the unit of an image frame for example with the JPEG method; an image memory 1006 for storing the image data of an image frame, expanded in the expansion circuit 1004; a switch 1008 for selecting a contact a (output of the expansion circuit 1004) in a case where the status signal from the error rate detection circuit 901 indicates that the amount of the uncorrectable error data within an image frame does not exceed a predetermined value, or a contact b (output of the image memory 1006) in a case where the status signal indicates that the amount of the uncorrectable error data exceeds the predetermined value; a record/reproducing device 1010 for recording the image data, selected by the switch 1008, on a recording medium 1012 and reproducing thus recorded image data; an image signal processing circuit 1014 for converting the image data from the switch 1008 or the reproduced image data from the record/reproducing device 1010 into a standard television signal such as of NTSC format; and a monitor 1016 for displaying the video signal for example of NTSC format, from the image signal processing circuit 1014.

For the recording medium 1012 there can be utilized various media such as a hard disk, an optical disk, a magnetooptical disk, a magnetic tape or a semiconductor memory.

Figure 11:
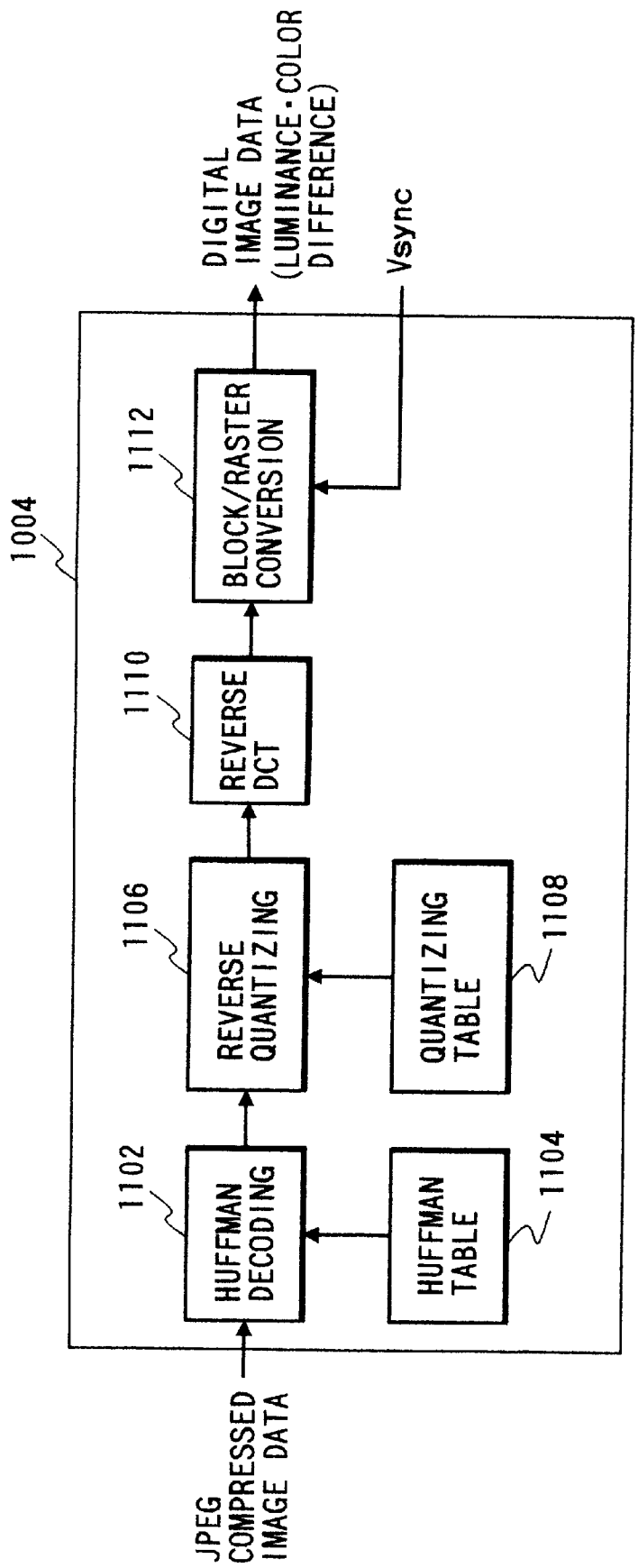
FIG. 11 is a block diagram showing the details of an expansion circuit 1004.

FIG. 11 is a block diagram showing the details of the expansion circuit 1004.

In FIG. 11, there are provided a Huffman decoding circuit 1102 for decoding the Huffman codes by referring to a Huffman table generated by a Huffman table generation circuit 1104; an inverse quantization circuit 1106 for inverse quantization of the output of the Huffman decoding circuit 1102 by referring to a quantization table generated by a quantization table generation circuit 1108; an inverse DCT circuit 1110 for executing an inverse descrete cosine transformation on the output of the inverse quantization circuit 1106; and a block/raster conversion circuit 1112 for converting the output of the inverse DCT circuit 1110 from block format into raster format. The block/raster conversion circuit 1112 releases the image data in succession in rasters, in response to an image synchronization signal from the control unit 902.

The circuit shown in FIG. 11 functions in the following manner. The Huffman decoding circuit 1102 converts the JPEG compressed image data into the data prior to encoding by the Huffman encoding circuit 510 by referring to the Huffman table, and the inverse quantization circuit 1106 multiplies the output of the Huffman decoding circuit 1102 with the quantization table. The matrix data obtained from the inverse quantization circuit 1106 contain a larger number of 0 in the high-frequency components, in comparison with the output matrix data obtained from the DCT circuit 504 at the compressing operation. The inverse DCT circuit 1110 effects inverse discrete cosine transformation on the output of the inverse quantization circuit 1106, and the block/raster conversion circuit 1112 converts the output of the inverse DCT circuit 1110 from block format into raster format. The JPEG compressed image data are expanded in this manner.

If the received data do not contain the uncorrectable transmission errors exceeding the predetermined amount, the control unit 902 shifts the switch 1008 to the contact a, whereby the output of the expansion circuit 1004 is supplied to the image signal processing circuit 1014 and the record/reproducing circuit 1010. If the uncorrectable transmission errors in the received data exceed the predetermined amount, the switch 1008 is shifted to the contact b, whereby the image data read from the image memory 1006 are supplied to the image signal processing circuit 1014 and the record/reproducing circuit 1010. Therefore, for an image that cannot be properly restored by the uncorrectable errors exceeding the predetermined amount, the image data of the preceding field or frame read from the image memory 1006 are supplied to the image signal processing circuit 1014 and the record/reproducing whereby the image interpolated with the image data of the preceding field or frame is displayed on the monitor 1016 and recorded on the recording medium 1012. As a result, even when the uncorrectable transmission errors exceed the predetermined amount, a very natural image can be displayed on the monitor 1016 and there can be avoided wasted image recording on the recording medium 1012. The recording unit 903 may be provided in the recording device 900 or may be provided as an outside unit separate therefrom. There may also be adopted such control as to record and display the preceding image for a predetermined counting time of the timer 720 in case the error rate exceeds a predetermined amount in continuous manner.

As explained in the foregoing, the second embodiment provides such a configuration as to record the already received image information in case the uncorrectable errors exceed a predetermined amount. It is however also possible, as in the first embodiment, to temporarily suspend the recording operation of the recording unit 903, in case the uncorrectable errors exceeding the predetermined amount continue for a predetermined period. Now reference is made to FIG. 12 for explaining the control in such configuration.

Figure 12:
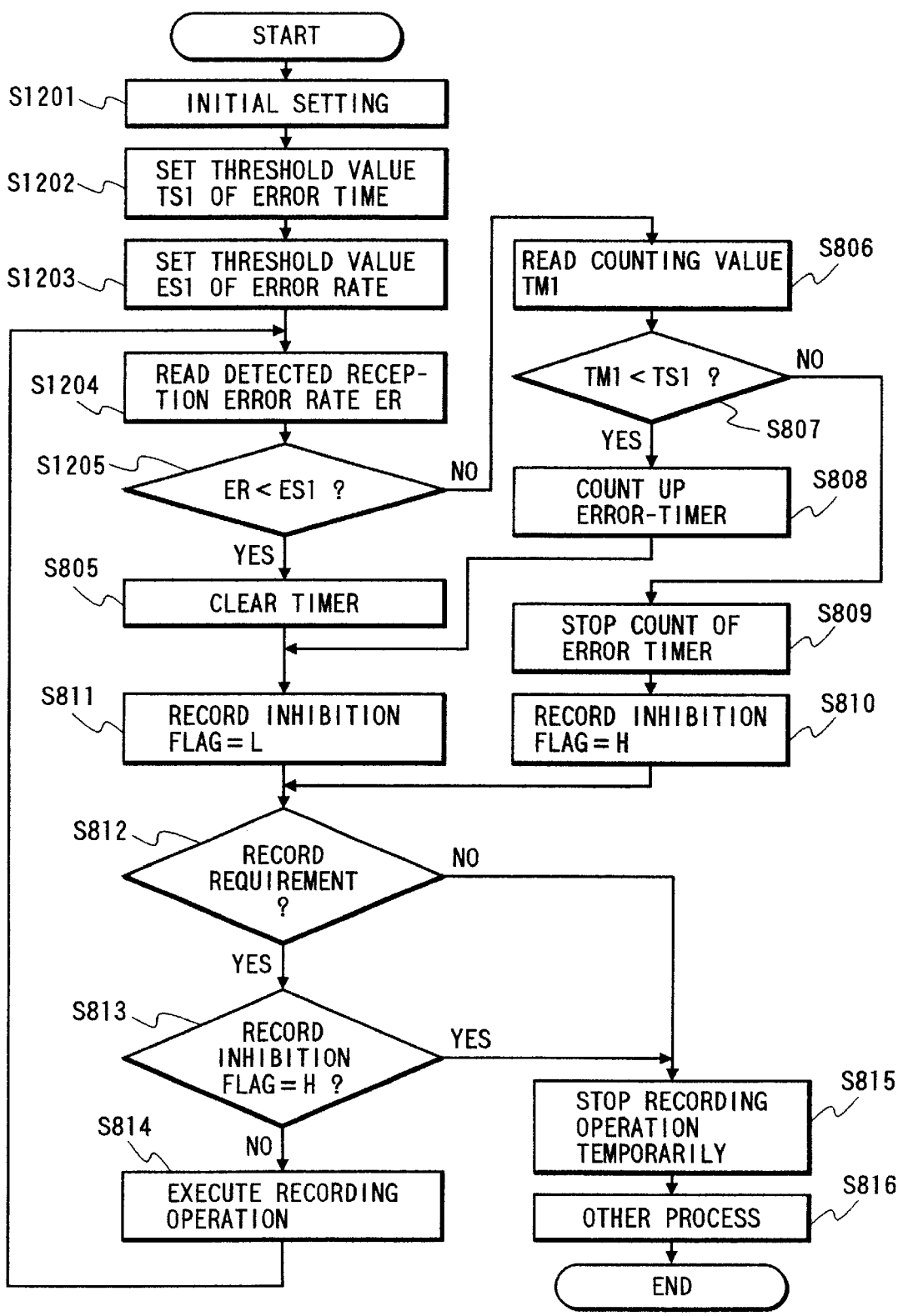
FIG. 12 is a flow chart showing an example of the function of a control unit 902 for controlling the recording operation of the recording unit 903.

FIG. 12 is a flow chart showing the function of the control unit 902 in controlling the recording operation of the recording unit 903. Processes equivalent to those in the first embodiment, shown in the flow chart in FIG. 8, will be numbered alike and will not be explained further.

Referring to FIG. 12, at first the control unit 902 initializes the recording 903 shown in FIG. 9 (S1201). Then the control unit 902 sets a threshold value TS1 indicating a continuous error time for initiating the inhibition of the recording operation (S1202) and a threshold value ES1 indicating the limit error rate (S1203). The error rate ER, obtained as the output of the error rate detection circuit 901, is fetched in a memory provided in the control unit 902 (S1204) and is compared with the set threshold value ES1 (S1205). If ER is smaller than ES1, the reception status is regarded as normal and there is executed a sequence starting from the step S805, but, if ER is at least equal to ES1, the reception status is regarded as defective and there is executed a sequence starting from the step S806. These sequences will not be explained further as they are same as those in the first embodiment.

In the present embodiment, in a case where the reception is possible from the image pickup device 300 in a distant location but the detected error rate ER of the received data is at least equal to the threshold value ES1 (S1205) because of an obstacle for transmission present on the way to the image pickup device 300, whereby the quality of the received image or voice information becomes deteriorated beyond a certain limit, there is identified a defective reception status and the counting operation of the timer 720 is executed (S808). If the detected error rate ER higher than the predetermined threshold continues for a predetermined period (S807), the recording inhibition flag is shifted to H (S810) whereby the recording operation is suspended even in the presence of the recording request from the user (S812, S813, S815).

In the second embodiment, as explained in the foregoing, in case the proper transmission of the image information becomes impossible for a predetermined period for example because of a lowered battery capacity of the power supply unit 314 in the image pickup device 300 or cutting off of the power supply thereto, the recording operation for such image information is temporarily suspended as in the first embodiment. Consequently there can be prevented the wasted consumption of the recording medium resulting from the abnormal reception signal and the wasted electric power consumption.

Also as in the first embodiment, the recording operation of the image signal is suspended also in case the image information from the image pickup device 300 cannot be received properly for a predetermined time, because of a large distance between the image pickup device 300 and the recording device 900 or the presence of an obstacle therebetween. Consequently there can be prevented the wasted consumption of the recording medium resulting from the abnormal reception signal and the wasted electric power consumption.

Furthermore, the second embodiment ensures recording of the reception signal of satisfactory quality only, because the quality of the reception signal (for example image or voice signal) is judged by detecting the error rate of such reception signal and the recording operation is suspended when the insufficient quality, judged as lower than predetermined quality, continues for a predetermined period.

[Third embodiment]

In the following there will be explained a wireless receiving device and a method therefor, constituting a third embodiment of the present invention, wherein components equivalent to those in the first and second embodiments will be represented by corresponding numbers and will not be explained in detail. Also process steps equivalent to those in the first and second embodiments will not be explained in detail.

In the first embodiment, the detection circuit 718 discriminates the proper reception, based on the signal level of the received carrier, and the control unit 710 controls the recording operation of the recording unit 706, utilizing the result of such discrimination. The third embodiment provides a configuration in which the detection circuit 718 is replaced by the error rate detection circuit 901 for detecting the error rate of the reception signal as in the second embodiment, and the recording operation of the recording unit 903 is controlled by the result of such detection.

Figure 13:
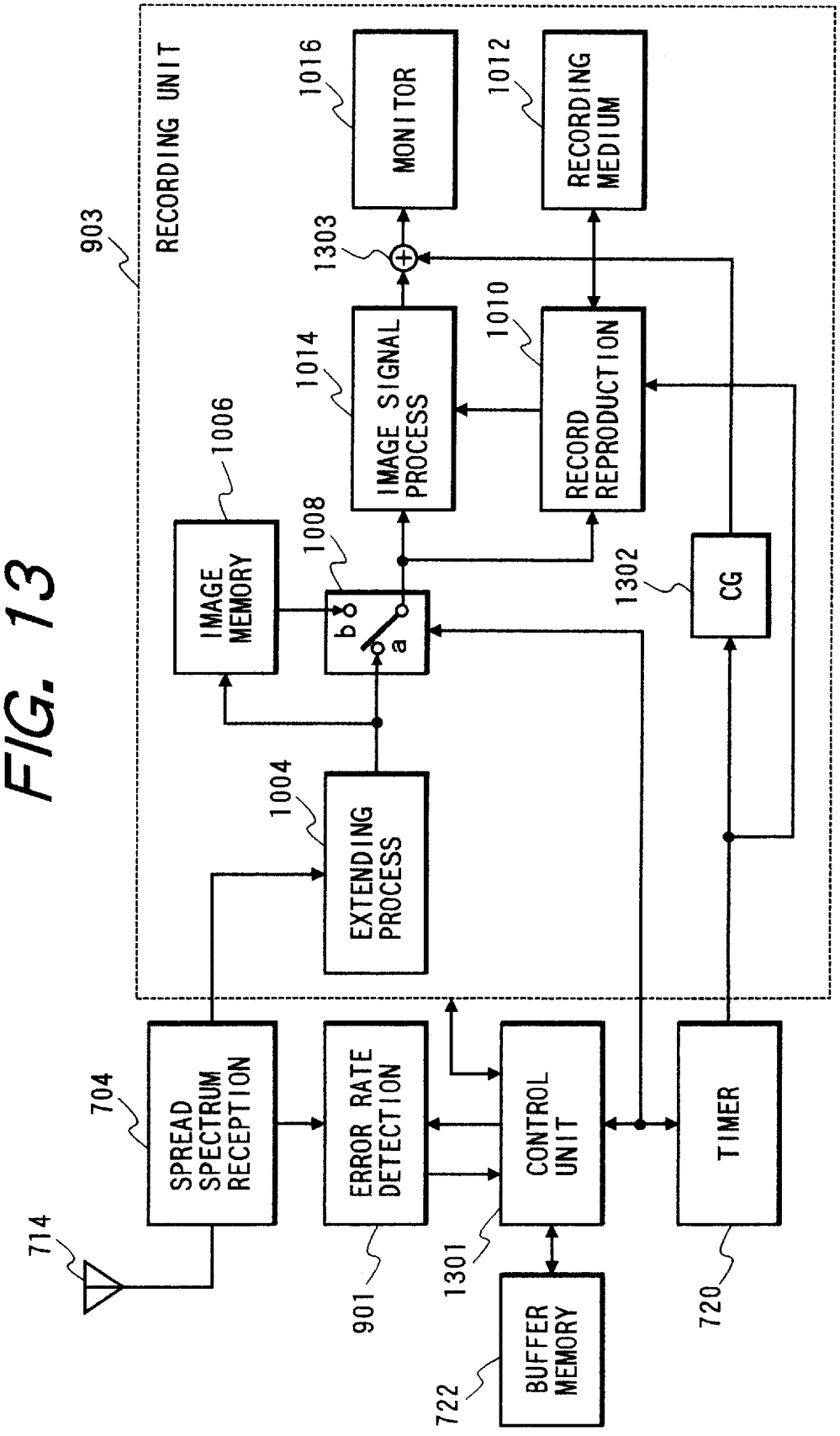
FIG. 13 is a block diagram showing the details of another example of the configuration of the recording unit 903.

FIG. 13 is a block diagram showing the details of another example of the recording unit 903 shown in FIG. 9. In FIG. 13, components equivalent to those shown in FIGS. 7 and 9 will be represented by corresponding numbers and will not be explained further.

Referring to FIG. 13, a control unit 1301 is provided with a microcomputer for controlling the various process circuits in the recording unit 903, and is adapted to effect error correction on the reception data, subjected to the inverse diffusion modulation in the spread spectrum reception circuit 704, utilizing an error correction circuit provided therein, and then to supply the data by a predetermined unit to an expansion circuit 1004. A character generator 1302 generates character signals for displaying a warning in response to a time-out signal from the timer 720. The output of the character generator 1302 is superposed with the output of the image signal processing circuit 1014 in an adder 1303 and supplied to the monitor 1016. Also the time-out output signal of the timer 720 is supplied to the record/reproducing device 1010 as a control command for terminating the recording operation of the record/reproducing device 1010. The recording unit 903 may be provided inside the recording device 900 or as an outside unit separate therefrom.

In the following the function of the third embodiment shown in FIG. 13 will be explained with reference to a flow chart shown in FIG. 14. In a case where the error rate of the received signal is lower than the predetermined value, the wireless reception device shown in FIG. 13 functions in the same manner as in the second embodiment, whereby the received image is displayed on the monitor 1016 as a still image or a moving image, and is recorded as a still image or a moving image on the recording medium 1012.

Figure 14:
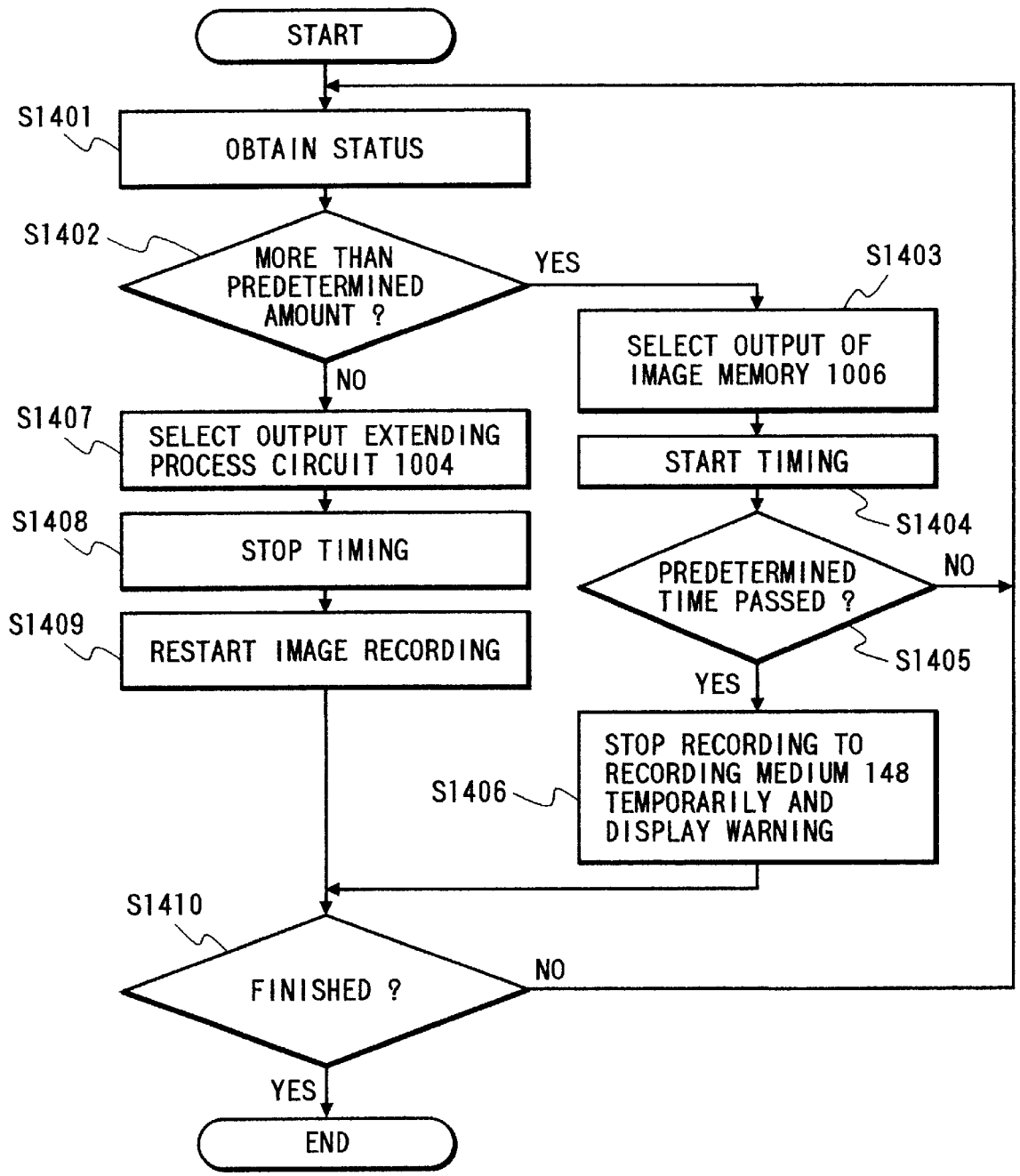
FIG. 14 is a flow chart showing an example of the function of a control unit 1301 for controlling the recording operation of the recording unit 903.

Referring to FIG. 14, a control unit 1301 supplies the switch 1008 and the timer 720 with a status signal, indicating the uncorrectable errors in an image frame is at least equal to a predetermined amount, based on the result of detection obtained from the error rate detection circuit 901 (S1401). In response to the status signal, the switch 1008 is shifted to the contact b, whereby the image data of an immediately preceding image frame are read from the image memory 1006 (S1402, S1403) and supplied to the image signal processing circuit 1014 and the record/reproducing device 1010. Consequently the record/reproducing device 1010 records a same image on the recording medium 1012 in repeated manner, and the monitor 1016 displays a same image in repeated manner.

Also the timer 720 initiates the counting operation in response to the status signal (S1404). If a predetermined period elapses while the uncorrectable transmission errors remain at least equal to the predetermined amount (S1405), the timer 720 generates a time-out signal, which is supplied to the character generator 1302 and the record/reproducing device 1010. In response to the time-out signal from the timer 720, the character generator 1302 generates a warning message indicating that the transmission state is inferior (S1406). The adder 1303 adds the warning message, generated by the character generator 1302, to the output of the image signal processing circuit 1014 and sends the sum to the monitor 1016, which displays the warning message and the image signal in a superposed manner. Also in response to the time-out signal from the timer 720, the record/reproducing device 1010 suspends the recording operation (S1406). In the present embodiment, a warning message is generated by the character generator 1302, but there may also be utilized an audio warning. Also in the present embodiment, the warning message is not recorded, but there can also be conceived a configuration for recording the warning message.

When the transmission status is improved and the error correction becomes possible (S1402), the switch 1008 is shifted to the contact a to select the output of the expansion circuit 1004 (S1407), and in response to the status signal from the control unit 1301, the timer 720 terminates the counting operation and clears the count. In response to the termination of the counting operation of the timer 720, the record/reproducing device 1010 re-starts the recording operation (S1409). If the termination of the recording operation of the recording unit 903 is instructed, the recording operation is terminated, but, if such instruction is not given, the sequence returns to the sequence starting from the step S1401 (S1410).

In the third embodiment, as explained in the foregoing, the recording operation is temporarily suspended in case a reception state where the image data cannot be properly restored continues for a predetermined period, whereby wasted use of the recording medium can be avoided. Also a major disturbance in the displayed image can be prevented as the image data in such situation are replaced by the image data of the preceding image frame. Besides a warning indicating such situation is provided, so that the user can easily understand the situation.

The present invention may be embodied in other specific forms without departing from the spirit or essential characteristics thereof.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A recording system, comprising:

a wireless receiver that receives image data;

a detector that detects whether a reception status of image data received by said wireless receiver is inferior; and a recorder that (i) records image data received by said wireless receiver if said detecter does not detect that a reception status of the image data received by said wireless receiver is inferior, (ii) records image data previously stored in a memory in lieu of image data received by said wireless receiver if said detector detects that the reception status of the image data received by said wireless receiver is inferior, and (iii) stops recording of the image data stored in the memory if recording of the image data stored in the memory is continued for a predetermined period of time.

2. A recording system according to claim 1, wherein said detector detects the reception status of the image data by detecting an error condition of the image data.

3. A recording system according to claim 1, wherein said wireless receiver receives image data transmitted from an imaging device.

4. A recording system according to claim 1, wherein the image data stored in the memory is image data previously received by said wireless receiver, before said detector detects that the reception status of image data received by said wireless receiver is inferior.

5. A recording system according to claim 1, further comprising an alarm that generates warning information if recording of the image data stored in the memory is continued for the predetermined period of time.

6. A recording system according to claim 1, wherein said wireless receiver receives image data that is modulated according to a spread spectrum modulation.

7. A recording method, comprising the steps of:

receiving image data by a wireless receiver;

detecting whether a reception status of image data received in the receiving step is inferior;

recording the image data received in the receiving step if in the detecting step the reception status of the image data received in the receiving step is not detected to be inferior;

recording image data previously stored in a memory in lieu of image data received in the receiving step if in said detecting step it is detected that a reception status of image data received in said receiving step is inferior; and stopping the recording step of recording image data previously stored in the memory if recording of image data previously stored in the memory is continued for a predetermined period of time.

8. A method according to claim 7, wherein said detecting step includes detecting a reception status of image data by detecting an error condition of the image data.

9. A method according to claim 7, wherein said receiving step includes receiving image data transmitted from an imaging device.

10. A method according to claim 7, wherein the image data previously stored in the memory is image data received before it is detected in said detecting step that the reception status of image data received in said receiving step is inferior.

11. A method according to claim 7, further comprising a step of generating warning information if the recording of image data previously stored in the memory is continued for the predetermined period of time.

12. A method according to claim 7, wherein said receiving step includes receiving image data that is modulated according to a spread spectrum modulation.

* * * * *

UNITED STATES PATENT AND TRADEMARK OFFICE
CERTIFICATE OF CORRECTION

PATENT NO. : 6,545,709 B2  Page 1 of 1
DATED : April 8, 2003
INVENTOR(S) : Hirofumi Takei et al.

It is certified that error appears in the above-identified patent and that said Letters Patent is hereby corrected as shown below:

Column 2,
Line 3, "following" should read -- following, --.

Column 3,
Line 1, "according" should read -- according to --.

Column 4,
Line 4, "ing" should read -- ing to --; and
Line 7, "according" should read -- according to --.

Column 13,
Line 61, "following" should read -- following, --.

Signed and Sealed this

First Day of July, 2003

JAMES E. ROGAN
*Director of the United States Patent and Trademark Office*